United States Patent Office 2,973,372
Patented Feb. 28, 1961

2,973,372

DIHYDROPYRAN OZONIDES AND THE METHOD OF MAKING THE SAME

Quentin E. Thompson, Belleville, Ill., assignor to Monsanto Chemical Company, St. Louis, Mo., a corporation of Delaware No Drawing. Filed Feb. 24, 1959, Ser. No. 794,814

12 Claims. (Cl. 260—347.4)

This invention relates to a new class of compounds and a process for their preparation. In particular this invention is concerned with dihydropyran ozonides and with the preparation thereof.

The present invention provides new and useful compounds of the structure

where R is a member selected from the group consisting of benzyl, tetrahydrofurfuryl, acyclic alkyl radicals, and cycloalkyl radicals having from 5 to 6 carbon atoms. The preferred acyclic alkyl radicals have from 1 to 13 carbon atoms.

The new compounds of this invention find utility as curing agents for polyester resins such as the following which consists of 1 mole of phthallic anhydride, 1 mole of maleic anhydride, and 2.4 moles of propylene glycol cooked to an acid value of approximately 35. Moreover, the new compounds of this invention compare favorably with such well known curing agents as benzoyl peroxide. Some of the new compounds of this invention exhibit exceptional capability in that they are able to effect cures of the polyester resins at room temperatures without any accelerator which is a desideratum for certain applications.[1]

The new dihydropyran ozonides or Δ-formoxy-α-hydroperoxy alkyl (cycloalkyl, benzyl, or tetrahydrofurfuryl) butyl ethers of this invention are prepared by dissolving dihydropyran in the desired alcohol which may be in excess. A stream of ozone in oxygen of a low concentration is then passed through the dihydropyran-alcohol solution until ozonization is effected at a temperature which may range from —70° C. to +10° C. depending upon the particular alcohol used. Any excess alcohol is removed leaving the dihydropyran ozonide as the desired product.

More specifically a dihydropyran ozonide like Δ-formoxy-a-hydroperoxybutyl-methly ether can be prepared by dissolving hydropyran in an excess of methanol. A stream of ozone in oxygen of approximately 3 percent concentration is then passed through the dihydropyran-alcohol solution at a rate of about 400 cc./minute through a sintered glass disk at a temperature of around —70° C. Ozone absorption is essentially complete when a molar equivalent of ozone in terms of the dihydropyran has been added. The flow of ozone is then terminated, and the excess alcohol is removed from the reaction mixture under reduced pressure and usually by keeping the pot temperature below 30° C. The clear oily liquid remaining is essentially the desired dihydropyran ozonide which is usually of surprising purity and suitable without further treatment as a curing agent for resins.

Where the alcohol employed is of low volatility, the above procedure is modified as follows. Stoichiometric amounts of the dihydropyran and desired alcohol are dissolved in an inert solvent such as methylene chloride, chloroform, carbon tetrachloride, ethyl acetate, aceto-

[1] Chemical and Engineering News, August 25, 1958, p. 75.

nitrile, hexane, dichloroethane, and the like. The resulting solution is then cooled to slightly above the freezing point of the mixture but usually not below —70° C. and ozonized in the manner and at the rate set forth above. Upon completion of the reaction the solvent is removed under reduced pressure and the clear oily dihydropyran ozonide recovered. In this process the use of low temperatures is not critical but is merely done to minimize the loss of solvent. The temperature of the reaction will depend upon the particular alcohol employed. For example, a lower temperature such as —70° C. can be effectively employed with methanol whereas higher temperatures up to 50° C. will be used with the less volatile alcohols which become viscous and difficult to work with at low temperatures.

The equation for the above reaction may be represented as follows:

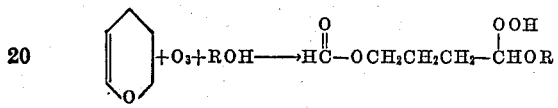

where R is a member selected from the group consisting of benzyl, tetrahydrofurfuryl, alkyl radicals having from 1 to 13 carbon atoms, and cycloalkyl radicals having from 5 to 6 carbon atoms.

The present invention will be more completely understood by reference to the following examples.

EXAMPLE I

Δ-formoxy-α-hydroperoxy-butyl-methyl ether

Dihydropyran (8.4 g. or 0.1 mole) was dissolved in 45 ml. of methanol. A stream of about 3 percent concentration of ozone in oxygen was passed into the solution at a rate of about 400 cc. per minute through a sintered glass disk until the calculated amount (0.1 mole) of ozone had been added. At this point the absorption of ozone ceased and the flow of ozone was terminated. The excess methanol was removed under reduced pressure at a temperature below 30° C. The clear liquid remaining was Δ formoxy-α-hydroperoxy-butyl-methyl ether. Analysis: Calculated for $C_6H_{12}O_5$ =C, 43.89%; H, 7.37%; $CH_3O$, 18.90%; found=C, 44.48%; H, 7.79%; $CH_3O$, 17.01%. Yield: 94% of theory.

EXAMPLE II

Δ-formoxy-α-hydroperoxy-butyl-ethyl ether

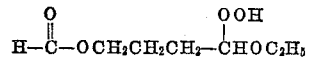

The procedure of Example I was repeated except 50 ml. of ethanol were used and clear liquid Δ-formoxy-α-hydroperoxy-butyl-ethyl ether was obtained in a quantitative yield. Analysis of active oxygen: Calculated— 8.98%; found—8.20%.

EXAMPLE III

Δ-formoxy-α-hydroperoxy-butyl-n-butyl ether

The procedure of Example I was modified in that 4.2 g. (0.05 mole) of dihydropyran and 3.8 g. (0.051 mole) of n-butanol were dissolved in 50 mls. of methylene chloride and then ozonized in the manner set forth in Example I above. The Δ-formoxy-α-hydroperoxy-butyl-n-butyl ether was obtained as a clear oil. Yield: 96% of theory. Analysis of active oxygen; Calculated— 7.7%; found 6.7%.

EXAMPLE IV

Δ-*formoxy-α-hydroperoxy-butyl-octyl ether*

$$H-\overset{O}{\underset{\|}{C}}-OCH_2CH_2CH_2\overset{OOH}{\underset{|}{C}}HOC_8H_{17}$$

The procedure of Example III was repeated except 8.4 g. (0.1 mole) of dihydropyran and 13.0 g. (0.1 mole) of n-octanol were dissolved in 25 mls. of methylene chloride and then ozonized at −20° C. instead of −70° C. The Δ-formoxy-α-hydroperoxy-butyl-n-octyl ether was obtained as a clear liquid. Yield: 99% of theory.

EXAMPLE V

Δ-*formoxy-α-hydroperoxy-butyl-tetrahydrofurfuryl ether*

$$H-\overset{O}{\underset{\|}{C}}-OCH_2CH_2CH_2\overset{OOH}{\underset{|}{C}}HOCH_2\text{-tetrahydrofurfuryl}$$

The procedure of Example IV was repeated except 10.2 g. (0.1 mole) of tetrahydrofurfuryl alcohol and 8.4 g. (0.1 mole) of dihydropyran were dissolved in 40 ml. of methylene chloride and ozonized at −70° C. The Δ-formoxy - α - hydroperoxy - butyl - tetrahydrofurfuryl ether was obtained in quantitative yield. Analysis of active oxygen: Calculated—6.84%; found—6.0%.

EXAMPLE VI

Δ-*formoxy-α-hydroperoxy-butyl-benzyl ether*

$$H-\overset{O}{\underset{\|}{C}}-OCH_2CH_2CH_2\overset{OOH}{\underset{|}{C}}HOCH_2\text{-phenyl}$$

The procedure of Example III was repeated except that 8.4 g. (0.1 mole) of dihydropyran and 10.8 g. (0.1 mole) of benzyl alcohol were dissolved in 50 mls. of methylene chloride and then ozonized at −70° C. The Δ-formoxy-α-hydroperoxy-butyl-benzyl ether was obtained as a clear oil in a quantitative yield. Analysis of active oxygen: Calculated—6.66%; found—5.4%.

The foregoing examples are merely illustrative and other ozonides which may be prepared include:

Δ-formoxy-α-hydroperoxy-butyl-cyclohexyl ether,
Δ-formoxy-α-hydroperoxy-butyl-tridecyl ether,
Δ-formoxy-α-hydroperoxy-butyl-decyl ether,
Δ-formoxy-α-hydroperoxy-butyl-isopropyl ether,
Δ-formoxy-α-hydroperoxy-butyl-tert.-butyl ether,
Δ-formoxy-α-hydroperoxy-butyl-tert.-heptyl ether,
Δ-formoxy-α-hydroperoxy-butyl-dodecyl ether,
Δ-formoxy-α-hydroperoxy-butyl-cyclopentyl ether,
Δ-formoxy-α-hydroperoxy-butyl-amyl ether,
and the like.

It is evident that various modifications may be made without departing from the scope of this invention by one skilled in the art, and it is therefore aimed in the appended claims to cover all such changes and modifications as fall within the true spirit and scope of the invention.

What is claimed is:

1. A compound of the structure $$H-\overset{O}{\underset{\|}{C}}-OCH_2CH_2CH_2\overset{OOH}{\underset{|}{C}}HOR$$

where R is a member selected from the group consisting of benzyl, tetrahydrofurfuryl, alkyl radicals having from 1 to 13 carbon atoms, and cycloalkyl radicals having from 5 to 6 carbon atoms.

2. A compound of the structure $$H-\overset{O}{\underset{\|}{C}}-OCH_2CH_2CH_2\overset{OOH}{\underset{|}{C}}HOR$$

where R is an alkyl radical having from 1 to 13 carbon atoms.

3. A compound of the structure $$H-\overset{O}{\underset{\|}{C}}-OCH_2CH_2CH_2\overset{OOH}{\underset{|}{C}}HOR$$

where R is a cycloalkyl radical having from 5 to 6 carbon atoms.

4. Δ-formoxy-α-hydroperoxy-butyl-methyl ether.
5. Δ-formoxy-α-hydroperoxy-butyl-isopropyl ether.
6. Δ-formoxy-α-hydroperoxy-butyl-octyl ether.
7. Δ-formoxy-α-hydroperoxy-butyl-ethyl ether.
8. Δ-formoxy-α-hydroperoxy-butyl-tetrahydrofurfuryl ether.
9. A process for the preparation of compounds of the structure $$H-\overset{O}{\underset{\|}{C}}-OCH_2CH_2CH_2\overset{OOH}{\underset{|}{C}}HOR$$

where R is a member selected from the group consisting of benzyl, tetrahydrofurfuryl, alkyl radicals having from 1 to 13 carbon atoms, and cycloalkyl radicals having from 5 to 6 carbon atoms which comprises reacting ozone with dihydropyran and a compound of the structure ROH where R has the same meaning as above.

10. The process of claim 9 wherein the reaction is carried out at a temperature of from −70° C. to 50° C.

11. The process of claim 9 wherein the reaction is carried out in the presence of an inert solvent.

12. The process of claim 11 wherein said solvent is methylene chloride.

No references cited.